United States Patent
Soehnlen et al.

(10) Patent No.: US 12,349,691 B1
(45) Date of Patent: Jul. 8, 2025

(54) SYSTEM AND PROCESS FOR HARVESTING SUBSTANCES FROM MILK

(71) Applicant: CREATIVE EDGE DESIGN GROUP LTD., Canton, OH (US)

(72) Inventors: Gregory M. Soehnlen, North Canton, OH (US); Gregory R. Soehnlen, North Canton, OH (US); Daniel P. Soehnlen, Canton, OH (US); Kevin Eddleman, Dennison, OH (US)

(73) Assignee: Creative Edge Design Group, Ltd., Canton, OH (US)

(*) Notice: Subject to any disclaimer, the term of this patent is extended or adjusted under 35 U.S.C. 154(b) by 238 days.

(21) Appl. No.: 17/511,315

(22) Filed: Oct. 26, 2021

Related U.S. Application Data

(60) Provisional application No. 63/105,615, filed on Oct. 26, 2020.

(51) Int. Cl.
 *A23C 9/142* (2006.01)
 *A01J 11/10* (2006.01)

(52) U.S. Cl.
 CPC ............ *A23C 9/1422* (2013.01); *A01J 11/10* (2013.01)

(58) Field of Classification Search
 CPC .............................. A23C 9/1422; A01J 11/10
 USPC ........................................................... 99/456
 See application file for complete search history.

(56) References Cited

U.S. PATENT DOCUMENTS

| | | | | |
|---|---|---|---|---|
| 4,876,100 | A * | 10/1989 | Holm | A23C 7/04 99/452 |
| 6,247,507 | B1 | 6/2001 | Soehnlen et al. | |
| 6,478,969 | B2 * | 11/2002 | Brantley | A23C 9/1425 210/651 |
| 7,544,296 | B2 * | 6/2009 | Kopf | A23C 9/1425 210/651 |
| 2002/0038787 | A1 * | 4/2002 | Hurwitz | G01N 30/0005 210/321.87 |
| 2004/0040448 | A1 * | 3/2004 | Dunker | A23C 9/1422 99/452 |
| 2012/0301591 | A1 * | 11/2012 | Fauquant | B01D 61/147 426/490 |
| 2020/0352189 | A1 * | 11/2020 | Dorland | A23C 9/1427 |
| 2020/0375141 | A1 * | 12/2020 | Önnheim | A01J 11/10 |

FOREIGN PATENT DOCUMENTS

CA 3121330 A1 * 6/2020 ........... A23C 9/1422

* cited by examiner

*Primary Examiner* — Steven W Crabb
*Assistant Examiner* — Ket D Dang
(74) *Attorney, Agent, or Firm* — Lippes Mathias LLP

(57) ABSTRACT

A system and process of producing extended fresh, ambient fresh, milk while harvesting desired components from the milk is disclosed. The system and process use substantially less pressure and low heat that can capture and segregate many beneficial components such as proteins, as well as advantageously harvesting IgG, while still obtaining extended fresh milk, ambient fresh milk equivalent to the shelf life associated with conventional UHT processing, and all at a substantially lower cost.

11 Claims, 11 Drawing Sheets

SYSTEM AND PROCESS FOR HARVESTING SUBSTANCES FROM MILK

This application claims the priority benefit of U.S. provisional application Ser. No. 63/105,615, filed Oct. 26, 2020, the entire disclosure of which is expressly incorporated herein by reference.

BACKGROUND

This disclosure relates to harvesting beneficial substances from raw milk, and particularly a system and associated process for harvesting these beneficial substances in an inexpensive manner. The preferred system and process also include producing milk having different butterfat contents achieved by providing raw milk that is initially separated into two components, and which through further processing becomes a sterile cream portion and a clean skim milk portion without employing a sterilization step.

It is known in the industry, particularly in association with production of cheese, that use of different filters having different membrane pore sizes allows a liquid or non-curd portion (where the curd portion is processed into cheese) or clean skim storage (or supply) to be physically separated into potentially beneficial substances, components, or particles therefrom. For example, in a first filter (500,000 Dalton (DA) (where a Dalton or unified atomic mass unit (u) is a unit of mass equal to $1.66 \times 10^{-27}$ kg) and 500,000 DA=0.2 micron), a clean skim (a byproduct of the cheese making process) is separated from the curd. The clean skim is directed through a first filter where a retentate (that includes Casein) is separated by the first filter. The retentate of the first filter includes natural whey. The permeate of the first filter is then directed through a second filter (100,000 (DA)=0.1 micron) where the retentate of the second filter includes immunoglobulin (IgG). The permeate of the second filter includes Alpha/Beta lac Albumin. Further, if the permeate of the second filter is directed through a third filter (10,000 (DA)=0.007 micron), the retentate separated by the third filter includes a whey protein isolate and the permeate that passes through the third filter results includes a lactose concentration product. These first, second, and third filters are based on molecular weight as opposed to a dimensional separation. Typically, in the manufacture of a hard cheese, the retentates are deemed to be unneeded constituents that are disposed of.

It is generally known that IgG bolsters the human immune system. Harvesting IgG that is naturally found in milk has not previously been known as a commercially viable system or process due to the small amount of IgG found in milk, i.e., on the order of 2 grams of IgG in each gallon of milk, and because known milk processing often use high temperatures for prolonged periods of time that destroy the IgG. Although it is not believed that harvesting IgG from milk is presently commercially practiced, there is desire to develop a cost-effective manner of harvesting IgG, for example from milk, because of the benefits associated with IgG.

It is also known in the dairy industry to develop a long shelf life product through an ultrahigh temperature (UHT) process. Although UHT milk has a desired long shelf life, the elevated temperatures associated with this process add substantial cost to processing UHT milk (on the order of $0.30-$0.50 per gallon). Further, the elevated temperatures associated with the UHT processing undesirably impact the taste of the final milk product. Consequently, there is a trade-off among (i) extended shelf life, (ii) cost to produce the UHT milk, and (iii) the taste of the UHT milk. Also, the elevated temperature associated with the UHT milk processing destroys some beneficial milk components (such as IgG as noted above).

A need exists to overcome these various shortcomings in the dairy industry, while being able to beneficially harvest desired substances from raw milk (for example, Immunoglobulin or IgG) while providing a system and process that provides for flexible milk processing and resultant milk having a long shelf life that avoids high temperature processing, does not adversely impact the taste of the milk, and can be cost effectively achieved.

SUMMARY

The inventive process herein uses or harvests different components of the milk. In the past, many of these components have not been effectively harvested or extracted, nor do existing processes permit harvesting of selected one(s) of these components, while in other instances the components have simply been discarded or thrown away.

The present process uses substantially less pressure and low heat that can capture and segregate many beneficial components such as proteins, including advantageously harvesting IgG, obtaining extended fresh milk, ambient fresh milk, and all in a cost effective manner.

The present process does not destroy the IgG that is typically destroyed in connection with the high heat used in present commercial milk processes.

Benefits and advantages of the present disclosure will become more apparent from reading and understanding the following detailed description.

DETAILED DESCRIPTION

Figure 1:
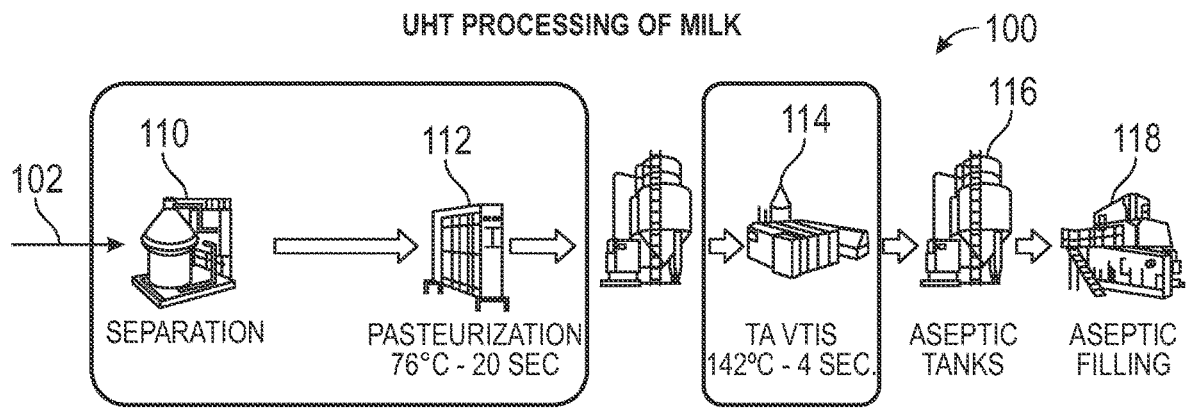
FIG. 1 is a schematic representation of an ultrahigh temperature (UHT) processing of milk to create a milk product having an extended shelf life.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Turning initially to FIG. 1, a conventional UHT system 100 is shown schematically and illustrates major features of the UHT processing of raw milk. More particularly, raw milk 102 is introduced into a separator or separation mechanism 110. The separator 110 receives the raw milk 102 and the raw milk is oftentimes heated (for example, to approximately 135° F.) to facilitate separation of the raw milk into skim milk and fat/cream portions or components. The skim milk portion proceeds through pasteurization (denoted by reference numeral 112) where the skim milk portion is subjected to an elevated temperature, for example 76° C. for 20 seconds, to pasteurize the skim milk. Thereafter, the skim milk is subjected to UHT processing as represented at stage 114 where the skim milk is elevated to an ultrahigh temperature (e.g., 142° C. for approximately four seconds). Subsequently, the pasteurized, UHT treated skim milk is stored in an aseptic tank 116. Then, using conventional fillers, individual bottles (not shown) are filled with the UHT milk at the filling stage 118 from the aseptic tank 116. As will be appreciated, this overview is generally known in the industry so that further description thereof is deemed unnecessary to a full and complete understanding of the present invention.

Figure 2:
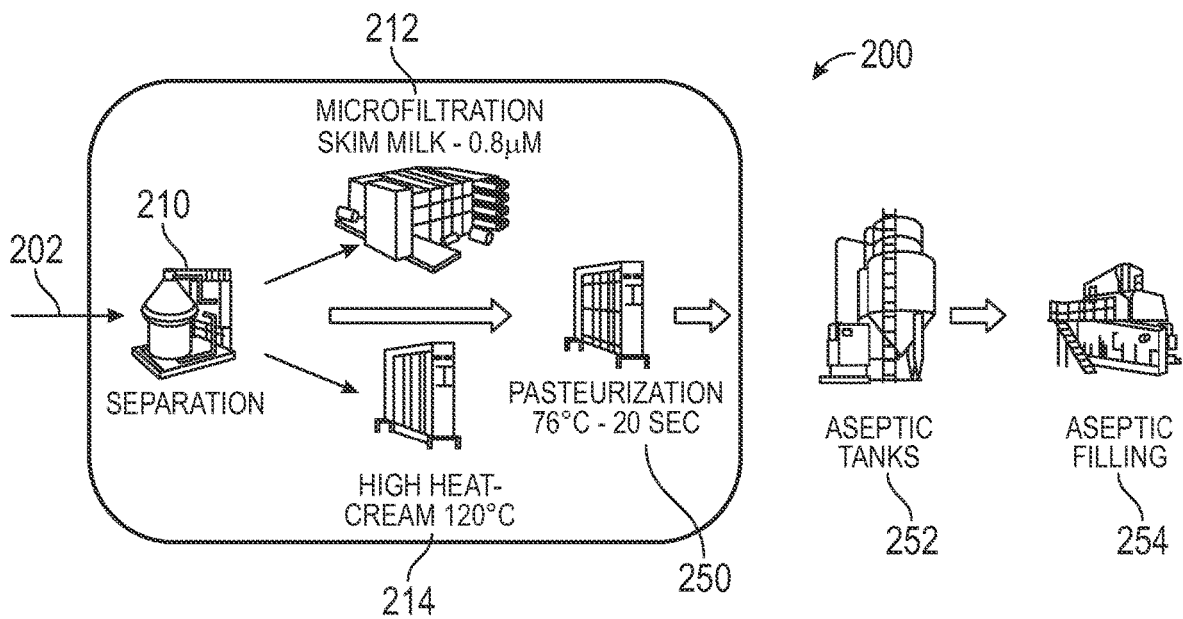
FIG. 2 is a schematic representation of the new system and processing of milk to create a milk product having an extended shelf life without high temperature treatment subsequent to pasteurization.
Figure 3:
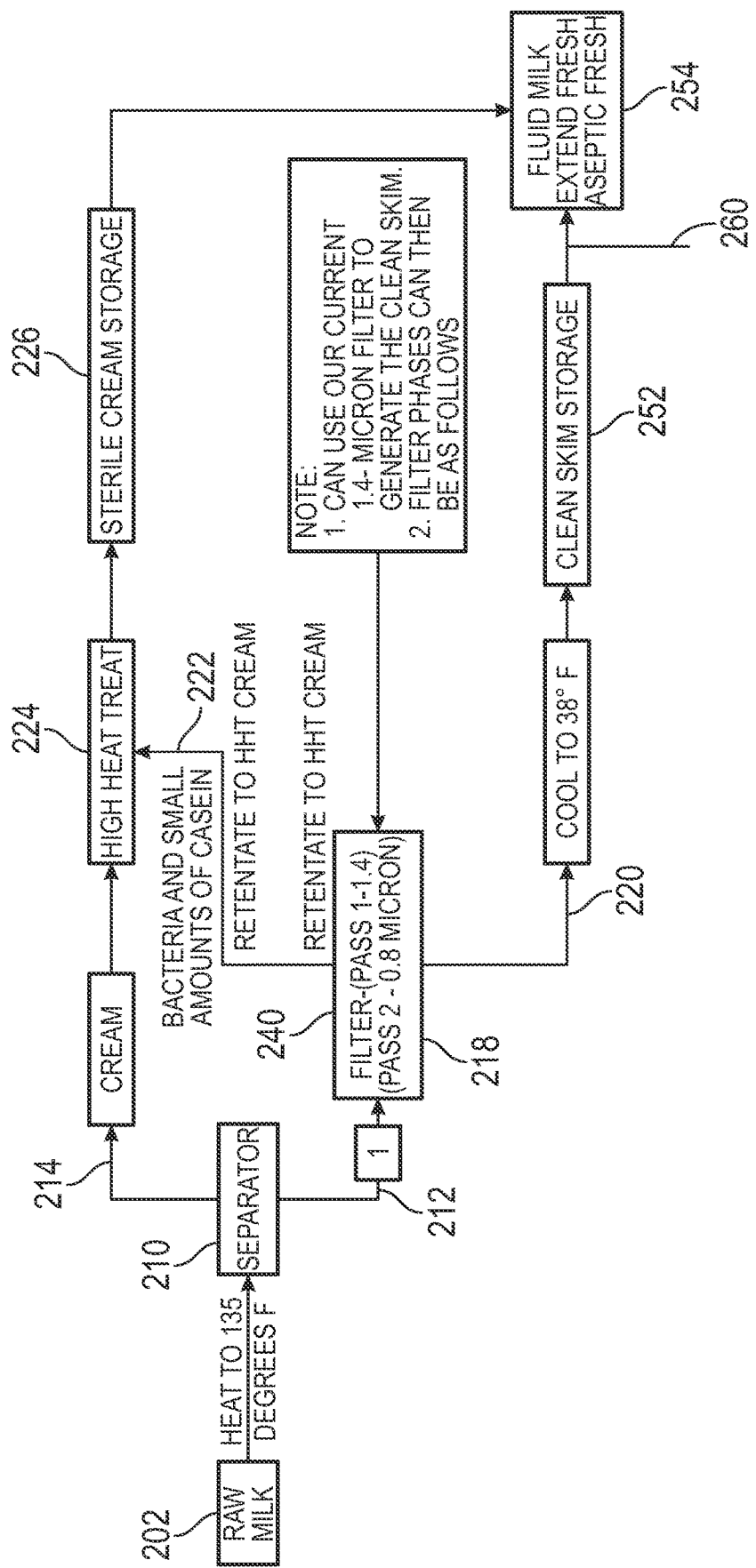
FIG. 3 is a schematic illustration of the present system and processing of raw milk into two components (sterile cream storage and clean skim milk storage) and subsequent combination to create milk having an extended shelf life.

Milk processing/system 200 that creates an extended fresh, ambient fresh milk that advantageously harvests certain components in the milk that could not be harvested under previously known milk processing procedures to create a long/extended shelf life (UHT milk) can be obtained in accordance with the present invention as generally, schematically illustrated in FIGS. 2 and 3. To facilitate an understanding of the present invention, like reference numerals in the "200" series are used to reference similar system components and processes, and the new system and process may include new reference numerals to describe differences relative to the known system and processes. More particularly, the new milk processing and system 200 begins with raw milk 202 being introduced into a separator 210 where the raw milk is segregated into a skim milk portion 212 and a cream portion 214. The raw milk 202 may be heated (e.g. heat to approximately 135° F.) to assist in separation of the raw milk into two portions or streams, namely, (i) skim milk portion 212 and (ii) cream portion 214. It is noted that in FIG. 2 the skim milk portion 212 is shown in the upper region and the cream portion 214 is shown in the lower region of the schematic drawing, while in FIG. 3 the skim milk portion 212 is shown in the lower region and the cream portion 214 is shown in the upper region of the drawing. As generally referenced in FIG. 2, the skim milk portion 212 undergoes a filtration (microfiltration) process 218 where a permeate 220 of the microfiltration process ultimately does not include components greater than 0.8 µm (0.8 microns).

Specifically, the skim milk portion from the separator 210 is initially passed (first pass) through a first filter portion sized at 1.4 µm (1.4 microns). The retentate 222 of the first filter portion (which includes components 1.4 µm or greater including, fat globules inter alia, and bacteria as a result of the microfiltration process 218 undertaken on the skim milk portion 212) is reintroduced to the cream portion 214 as represented by reference numeral 222. Before reintroducing the retentate of the 1.4 µm filter portion to the cream portion 214, the retentate undergoes a high heat treatment 224 (e.g., approximately 284° F./120° C. for approximately six seconds), and thereafter this temperature treated 1.4 µm retentate is cooled to 38° F. and then reintroduced (i.e., combined) with the cream portion. As will be appreciated, the 1.4 µm retentate is a reduced amount (volume) that is preferably being heat treated rather than heat treating the cream portion after the heat treated retentate is reintroduced into the cream portion. The cream portion is considered sterile and stored it is ready to be blended to make 3.25% milk. 226 (denoted sterile cream storage in FIG. 3).

The permeate from the 1.4 µm filter undergoes a second pass through a second filter portion (0.8 µm) of the microfiltration process. Specifically, the permeate from the 1.4 µm filter is introduced into the second filter portion (0.8 µm) of the microfiltration process. The retentate of the second filter portion (which includes bacteria and casein (protein)) is heat treated (e.g., approximately 284° F./120° C. for approximately six seconds), subsequently cooled (e.g., to 38° F.), and then added/combined to the permeate of the second filter portion (0.8 µm) in the skim milk stream. The skim milk is considered bacteria-free and stored it is ready to be blended to make 3.25% and skim milk (denoted clean skim storage in FIG. 3). The sterile cream storage 226 and bacteria-free skim milk 252 are blended, homogenized and pasteurized (e.g., 170° F. for 16 seconds) to make 3.25% milk and skim milk stored in pasteurized surge tanks (not shown) for filling (denoted clean skim storage in FIG. 3). Particularly, the sterile cream storage 226 has a butter fat content of approximately 42% and the clean skim storage 252 has a butter fat content of approximately 0.05%. These two components (226, 252) are blended to make 3.25% and skim milk portions as represented at 254 in FIG. 3, these two portions are homogenized and pasteurized (as required by regulation, for example, in the U.S). As noted, the cream portion 226 is considered sterile and the skim milk 252 is bacteria-free so that in some countries that do not have these pasteurization regulations, the two components 226, 252 may not require pasteurization before being blended and stored in surge tanks for subsequent filling.

As is evident in FIG. 3, the microfiltration process 218 can be achieved in different ways. For example, the microfiltration process 218 may be a multi-pass process where the skim milk portion 212 passes through a first filter or filter portion 240 (for example, rated at 1.4 µm) and then the permeate from the first filter is subsequently directed in a second pass through a second filter or filter portion 242 (for example, rated at 0.8 µm). The separate retentates from these first and second passes, i.e. through the first filter portion 240 and the second filter portion 242, are each heat treated and reintroduced into the cream portion and the skim milk portion, respectively. Consequently, through this process, the raw milk 202 is separated into the skim milk portion 212 and the cream portion 214, retentate portions of the first and second filter portions each undergo a high heat treatment and cooling before reintroduction into the cream portion and skim milk portion, respectively, and through downstream processing and stored as separate portions in separate storage tanks, namely sterile cream storage tank 226 and clean skim milk storage 252 (FIG. 3).

The two portions of the milk, i.e. sterile cream portion and clean skim milk portion, may be used individually and/or combined via any known standard pasteurizing and filling system as represented at 254 (FIG. 2), and preferably via a flexible filling system (see FIGS. 10-12) as shown and described in commonly owned U.S. Pat. No. 6,247,507, the entire disclosure of which is incorporated herein by reference. As will be appreciated, however, the high-fat (cream) and low-fat (skim milk) portions are different from the high-fat and low-fat milk portions described in the commonly owned '507 patent as a result of the microfiltration processing of the skim milk stream processing that occurs downstream of the separator, and the reintroduction 222 of the retentates (after the high heat treatments and cooling) from the microfiltration process 218 (1.4 µm filter and 0.8 µm filter passes) to the cream portion 214 and skim milk portion 212, respectively.

Figure 4:
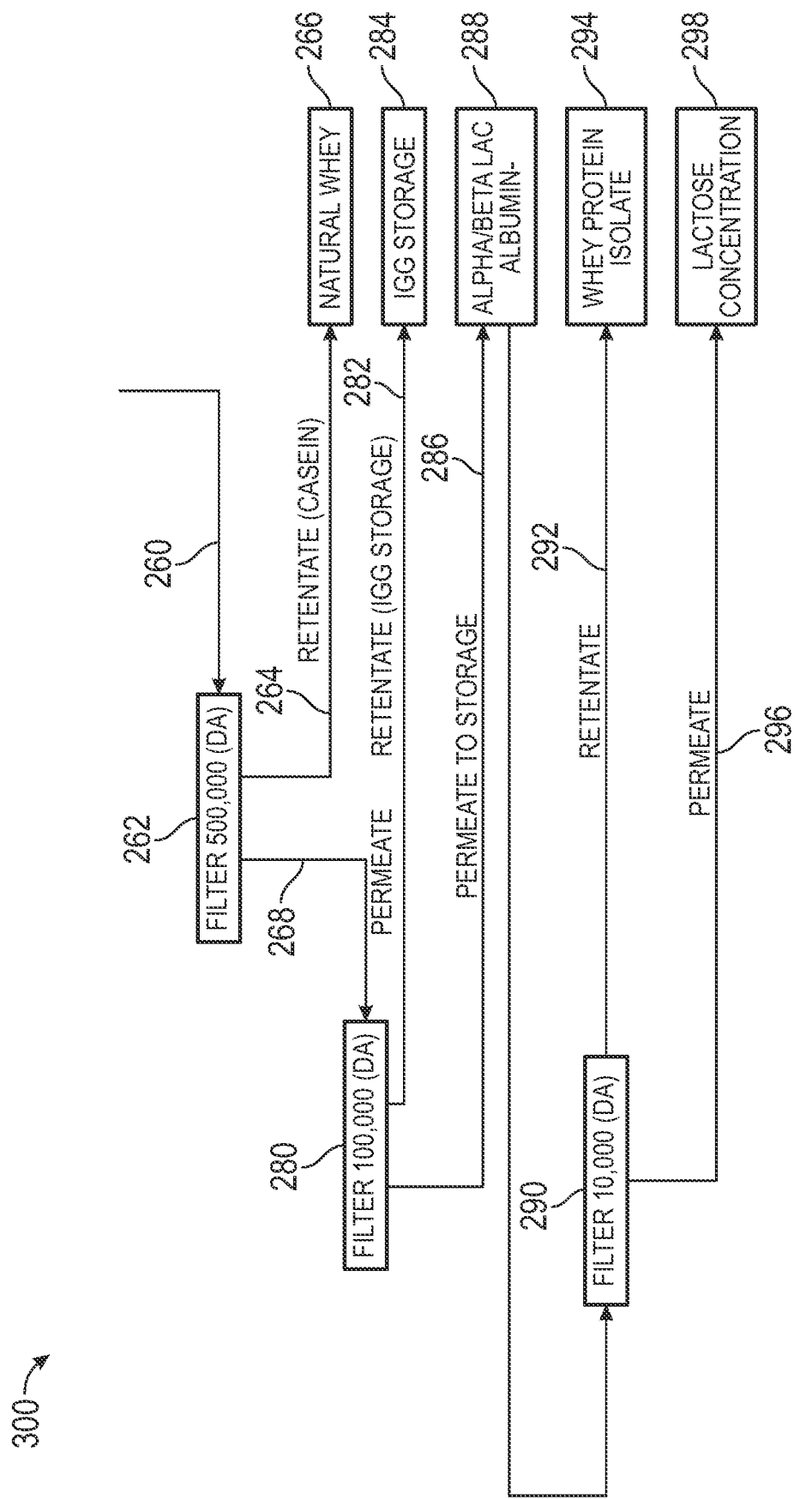
FIG. 4 is a schematic illustration of the system and downstream processing of clean skim storage via nano-filtration to harvest various components from raw milk.

Moreover, and importantly, the milk portion 212 does not undergo ultra high temperature (UHT) processing between the separator 210 and the clean skim storage 252. This assures that the clean skim milk portion 222 advantageously includes many components, e.g. proteins, IgG, etc., that are not present in UHT processed milk as a result of the high temperature encountered in UHT milk processing (for example, on the order of 142° C. for four seconds). These additional components are advantageously harvested in a multi-step filtration process shown in FIGS. 4 and 6-8. Importantly, because large components/particles have already been removed (filtered) from the skim milk portion directed into a step-down filtering process of Figures via the microfiltration process described above in connection with FIG. 3, the subsequent filters of FIGS. 4 and 6-8 occurs at low pressure (e.g., at a pressure level of approximately 35 psi rather than at an elevated pressure of 180 to 200 psi). Line 260 shown in both of FIGS. 3 and 4 represents use of clean skim milk storage (preferably created in a manner as generally described with respect to FIGS. 2 and 3 above) through the additional multi-step nanofiltration process generally referenced as system 300 in FIGS. 4 and 6-8. The clean skim milk 260 is introduced to a third filter 262 (first filter of the nanofiltration process) (referenced herein as filter 500,000 Dalton (DA) which is about $8.3 \times 10^{-22}$ kg) where the retentate 264 comprises larger particulates (casein) to develop natural whey 266. A Dalton (DA) or unified atomic mass unit (u) is a unit of mass equal to $1.66 \times 10^{-27}$ kg.

The permeate 268 from the third filter 262 is introduced into a fourth filter 280 (second filter of the nanofiltration process) (referenced herein as filter 100,000 (DA)). The fourth filter 280 further separates desired components from the clean skim milk portion. Particularly, retentate 282 from the fourth filter 280 includes components such as immunoglobulin (IgG) 284 which is an antibody that stimulates the immune system. IgG is found in the raw milk of healthy cows, i.e. cows with good immune systems. IgG 284 is not a drug, rather it is a supplement used to make the human immune system, for example, stronger and more resistant to viruses, bacteria, etc. It is estimated that approximately 2.2 g of IgG 284 are present in a gallon of milk; however, even though the IgG is a small portion of the milk, the present process allows IgG to be effectively harvested particularly in a commercial dairy where large volumes of raw milk are being processed into various milk products. Permeate 286 from the fourth filter 280 (second filter of the nanofiltration process) includes Alpha/Beta lac-Albumin 288 still another desirable, harvested by-product of the present process.

A fifth filter 290 (third filter in the nanofiltration process) (referred to herein as filter 10,000 (DA)) is located downstream of the fourth filter 280 and further segregates the permeate 286 from the fourth filter into a retentate 292 from which whey protein isolate 294 may be harvested. The permeate 296 from the fifth filter includes lactose concentration 298. The concentrated lactose 298 is generally deemed a "good" sugar that breaks down quickly and has a variety of end uses.

Advantageously, IgG 284 manufactured for the pharmaceutical industry does not require the skim milk portion to be pasteurized. However, the skim milk portion used in milk processing is required to be pasteurized. Fortunately, the temperature level and the duration of the elevated temperature to which the skim milk portion is subjected does not destroy the IgG 284 in the skim milk portion and thus IgG 284 can be effectively and cost efficiently fractionated from the skim milk that is processed for use in a commercial dairy. On the other hand, milk processing that undergoes UHT processing does destroy the IgG so that certain components (e.g., IgG 284) cannot be harvested from UHT processed milk. It has been determined that the present system and process of producing milk can advantageously create milk with a long shelf life (extended fresh and ambient fresh milk production) while also harvesting certain components from milk (IgG, for example) that could not be obtained with present day systems and processes of producing extended shelf life milk (e.g., UHT). Thus, the microfiltration 218 that removes the certain bacteria and other components greater than 0.8 μm (0.8 microns) (using the first filter and second filter in the preferred arrangement) from the skim milk portion, and reintroduces the retentates from the first and second filters of the microfiltration process to the cream portion and skim milk portion (where these retentate components undergo a high heat treatment/cooling), still allows extended fresh, ambient fresh milk to be produced, while also allowing harvesting of desired milk components that could not be obtained in prior, known milk producing processes.

Figure 5:
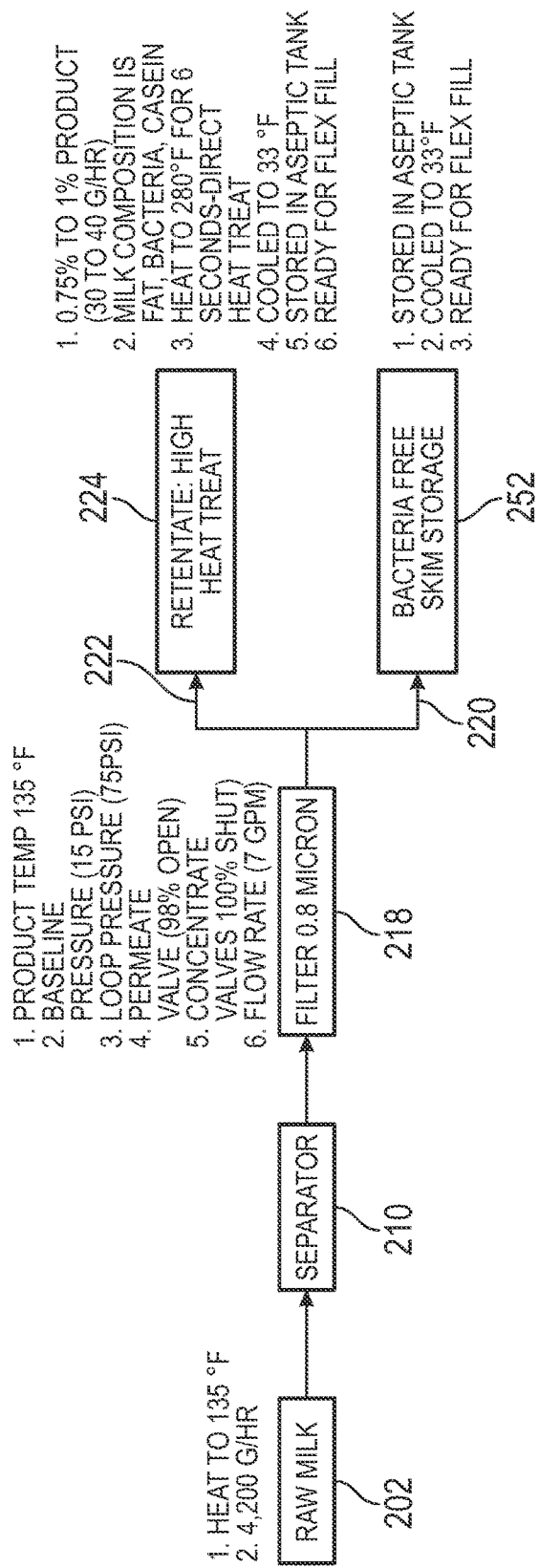
FIG. 5 is a schematic illustration of the processing of the clean skim portion of FIG. 3.

FIG. 5 is another schematic overview of the preferred process shown and described in detail with respect to FIGS. 2-4. Additional processing parameters are detailed in FIG. 5. Again, it is noted that the raw milk is preferably heated to 135° F. to facilitate separation in the separator 210. The skim milk portion 220 is heated at a product temperature of 135° F., and a baseline pressure of approximately 15 psi, when the skim milk portion is introduced into the microfiltration process. A loop pressure through the filter 218 (or first and second filters) is preferably at 75 psi. The permeate valve is 98% open while the concentrate valve is 100 percent shut. This results in a flow rate of about 7 gallons per minute. From the filter 218, the retentate 222 from the 1.4 μm filter is directed for high heat treatment 224 (heat to 280° F. for six seconds), cooled, and re-mixed/combined with the cream portion 214 and the retentate from the 0.8 μm filter is likewise directed for high heat treatment, cooled, and recombined with the skim milk portion. The cream portion is subsequently stored in an aseptic tank and similarly the skim milk portion is stored in an aseptic tank and ready for downstream filling operations.

Figure 6:
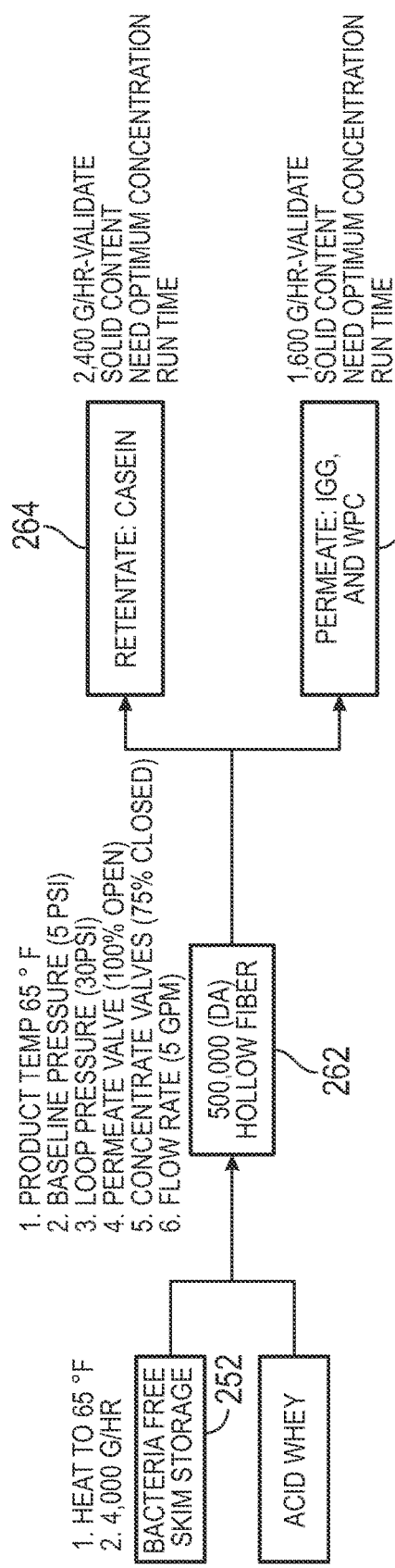
FIG. 6 is a schematic illustration of the initial portion of the nano-filtration portion of FIG. 4.

FIG. 6 provides representative processing parameters related to the third filter (500,000 DA hollow fiber filter). The incoming clean skim milk storage in line 260 is at approximately 65° F. and flows at approximately 4000 gallons per hour. A baseline pressure is at approximately five psi with the loop pressure through the filter at approximately 30 psi. With the permeate valve 100% open, and the concentrate valve 75% closed, the flow rate is approximately 3 to 5 gallons per minute through the third filter. As noted previously, the retentate's casein harvested at approximately 2400 gallons per hour while the permeate which contains the IgG is harvested at approximately 1600 gallons per hour.

Figure 7:
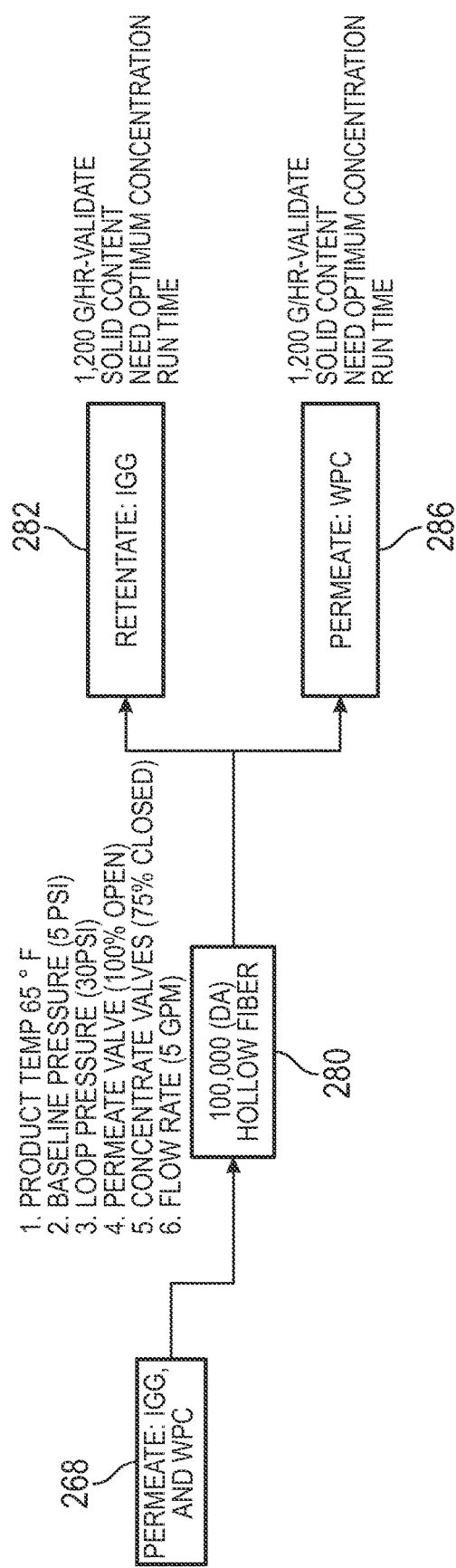
FIG. 7 is a schematic illustration of a second portion of the nano-filtration portion of FIG. 4.

FIG. 7 illustrates the treatment of the permeate from the fourth filter (100,000 DA hollow fiber) directed to the fifth filter 290. Product temperature is approximately 65° F., the baseline pressure is at five psi, and the loop pressure is at 30 psi. With the permeate valve 100% open, and the concentrate valve approximately 75% closed, the flow rate is approximately 5 gallons per minute.

Figure 8:
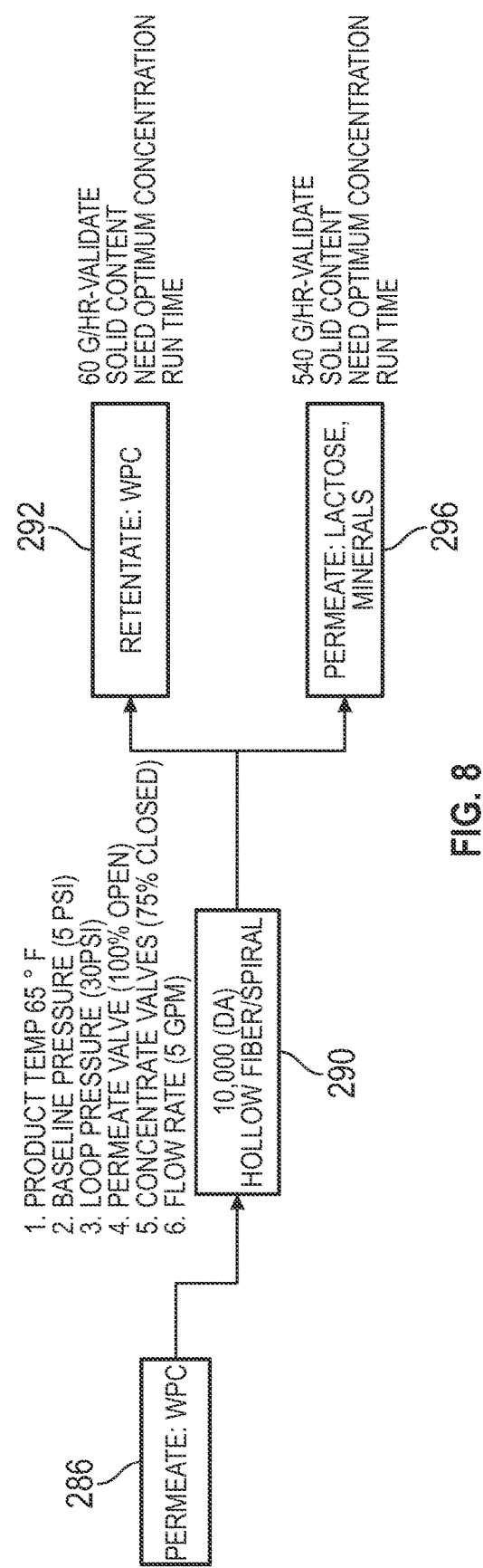
FIG. 8 is a schematic illustration of a third portion of the nano-stream filtration portion of FIG. 4.

FIG. 8 relates to the permeate 286 at a product temperature 65° F. and a baseline pressure of five psi. Again, the loop pressure through the fifth filter 290 (10,000 DA hollow fiber) is at 30 psi and with the permeate valve 100% open and the concentrate valve 75% closed, the flow rate is approximately 5 gallons per minute. At these rates, approximately 60 gallons per hour of WPC retentate 292 is collected and the permeate 296 comprising lactose and other minerals is harvested at approximately 540 gallons per hour.

One of ordinary skill in the art will understand that the particular values outlined in connection with FIGS. 5-8 are exemplary only, and that different temperature, pressure, and flow rate values can be used as long as the alternate values achieve the same objectives of the present invention.

Figure 9:
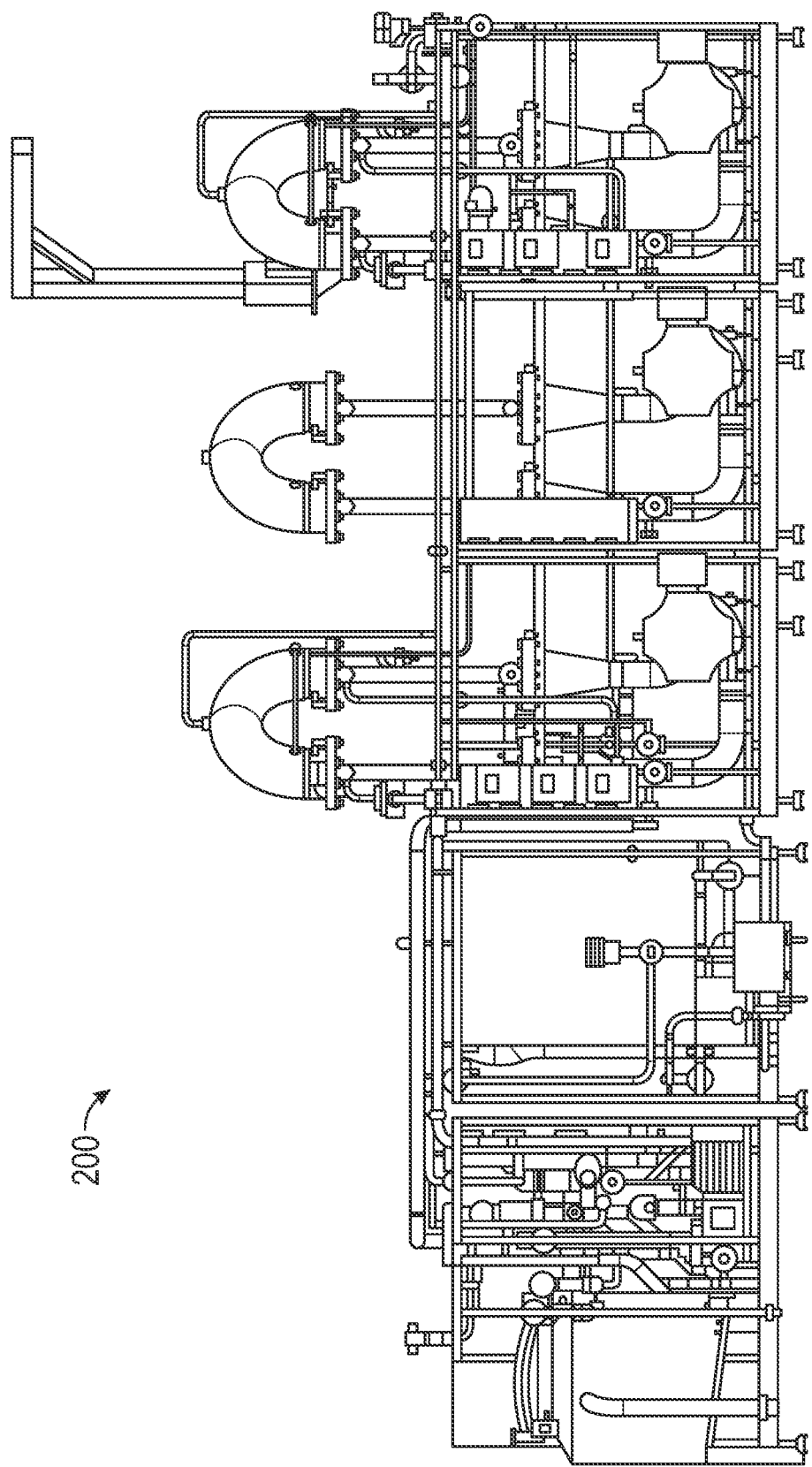
FIG. 9 is an elevational view of the system that processes raw milk to create a milk product having an extended shelf life without high temperature treatment subsequent to pasteurization, and that provides a clean skim milk storage source for the nano-filtration system and process for harvesting various components from raw milk.

FIG. 9 illustrates the physical layout of the system. The system is notable since the fractioning of the raw milk into the desired substances or components of the milk via the filtration process can be achieved at low pressures—and that could not be achieved without the microfiltration steps that are advantageously employed in the non-UHT milk processing described above in connection with FIGS. 2 and 3.

Figure 10:
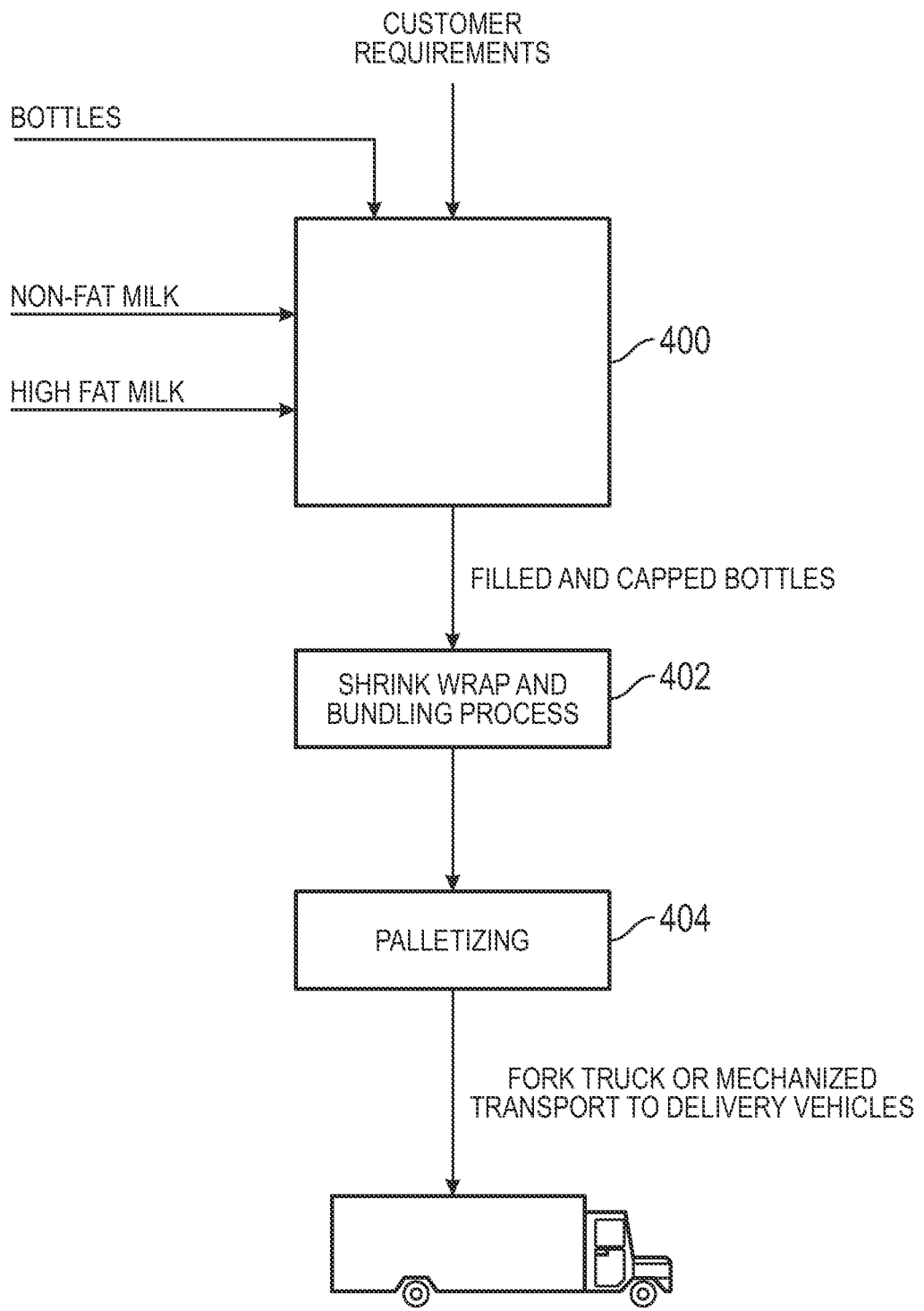
FIG. 10 is a schematic representation of a milk bottling system and process using flexible filling concepts.
Figure 11:
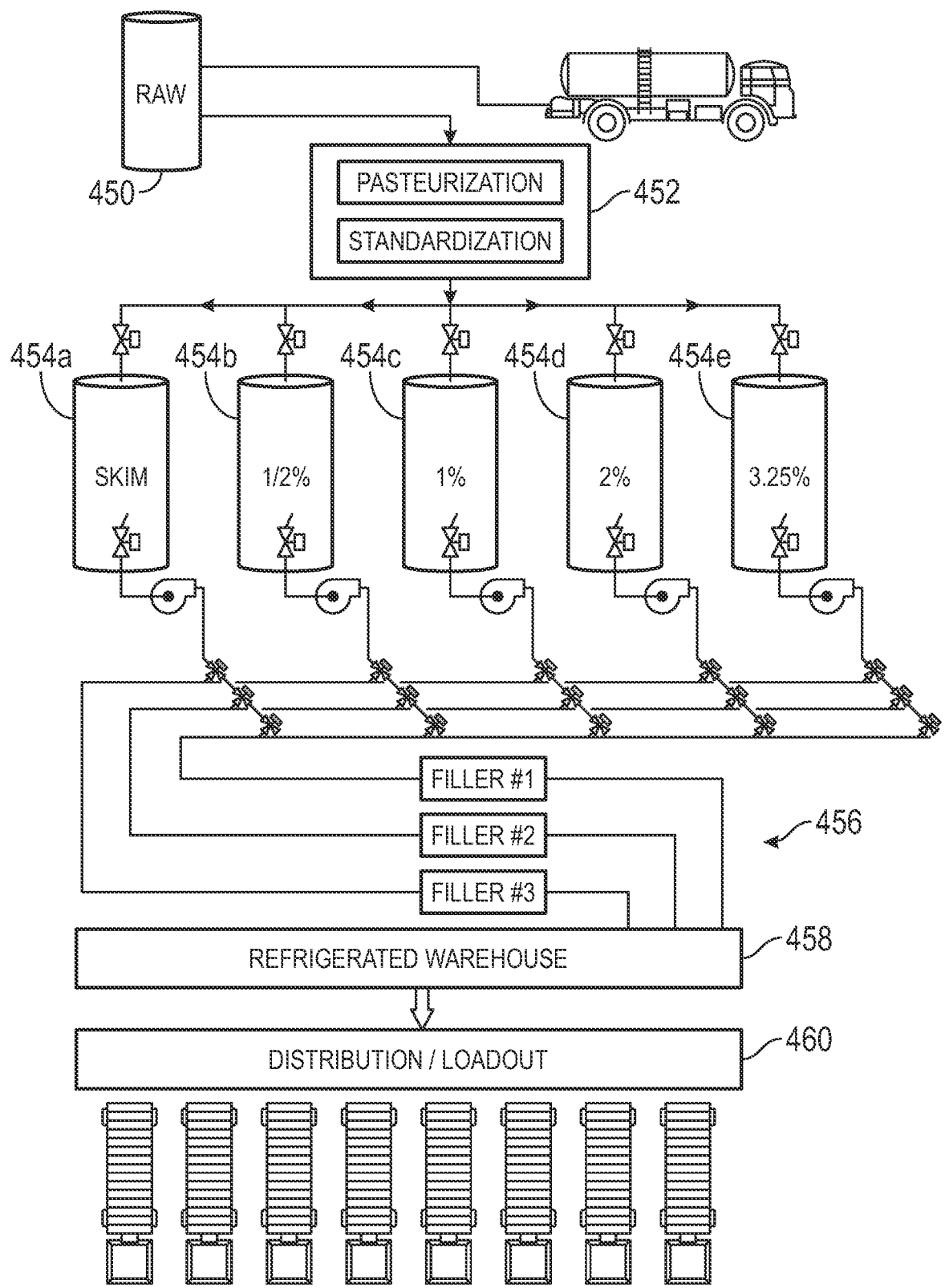
FIG. 11 is a schematic representation of a milk bottling system and process illustrating conventional separation of raw milk into segregated butterfat reservoirs for selectively filling milk bottles.
Figure 12:
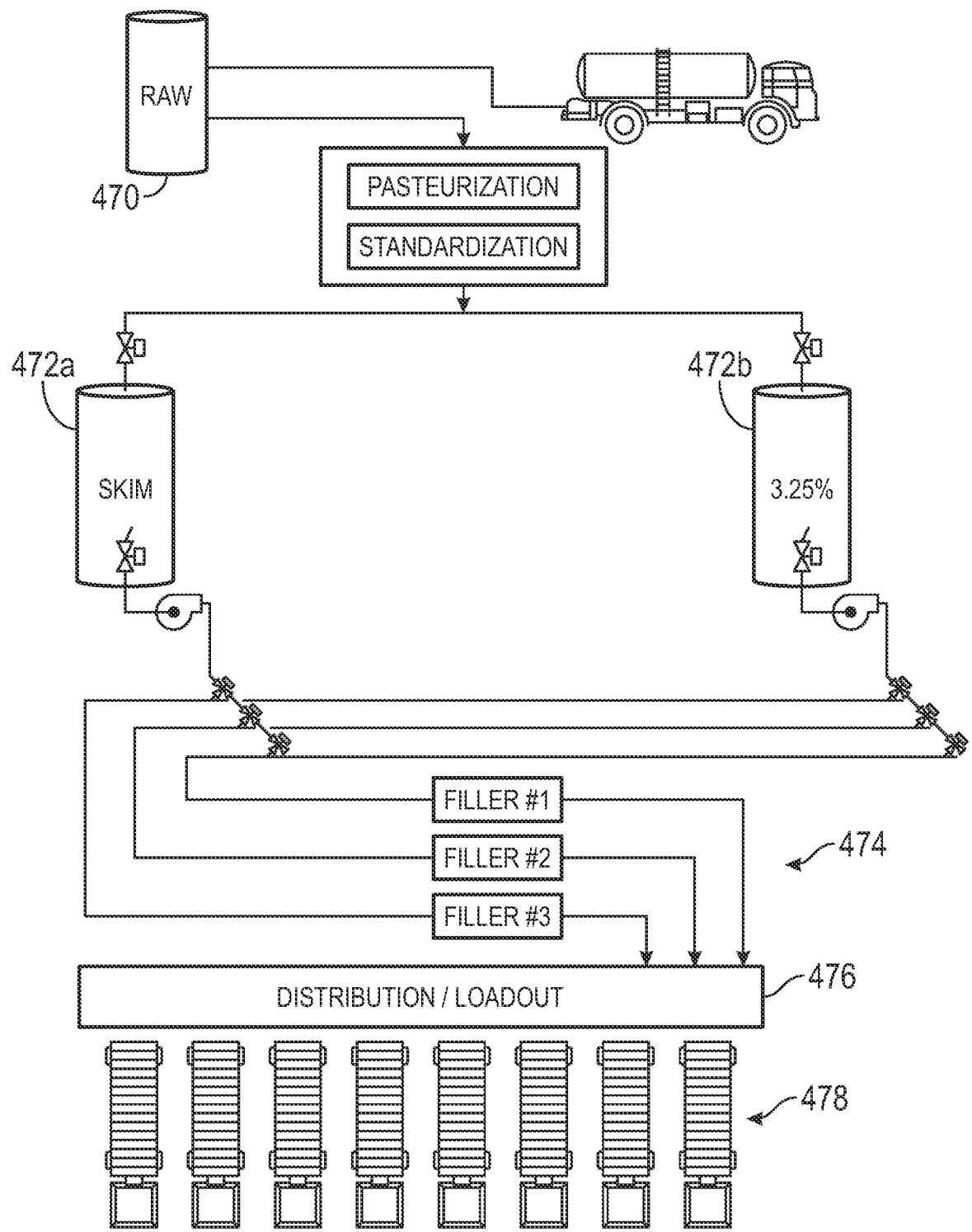
FIG. 12 is a schematic representation of the separation of raw milk into first and second segregated butterfat reservoirs for use in the flexible filling process of FIG. 10.

FIGS. 10-12 illustrate the preferred flexible filling system shown and described in connection with commonly owned U.S. Pat. No. 6,247,507. Particularly, FIG. 10 conceptually illustrates the integration of the flexible manufacturing system into a distribution process. A manufacturing cell 400 operates in response to customer requirements input into an information system, and discharges filled and closed product (e.g. filled milk bottles) to a wrapping/bundling system 402 in a sequence that exactly matches the distribution requirements and the customer requirements as needed for consumer satisfaction and optional operational efficiency. Without losing the predetermined sequence, the products are palletized at station 404 to provide a specific pallet with a predetermined mixture of milk products, for example, nonfat, ½%, 1%, 2%, or 3.25% milk products on one or more layers of the pallet. Each pallet may also have a varying number of layers. For example, one pallet may have three layers and another pallet may have four layers. The final determination is based on the optimization of the customer requirements and distribution processes.

FIG. 11 illustrates the ability to flexibly fulfill customer requirements. A common feature among full-service dairy manufacturers and distributors is that approximately 60% of the daily throughput is white milk described as skim milk, 0.5%, 1%, 2%, or 3.25% milk. In the past, manufacturers created large batches of these white milk products. As shown in FIG. 11, the process begins with raw milk being received and temporarily stored in tanks 450. Raw milk is withdrawn from the raw tanks 450, pasteurized and standardized at 452 into large vessels 454*a-e* to hold each type of pasteurized and standardized product (3.25%, 2%, 1%, ½%, skim). Filling machines 456 will then draw from the various pasteurized product tanks, one product at a time and put a specific type of milk into a specific bottle (could be pre-labeled). These filled bottles are then put into returnable cases were transport devices or corrugated one-way shippers. The product is then sent to a storage or distribution center type of system 458. Product is collected from storage 458 based on orders from customers. The product is picked, selected, accumulated, or assembled into a load that will put onto a delivery vehicle with the usual mission of only delivering the dairy products that particular dairy warehouse or distributor as represented at 460. If desired, this less preferred bottling process could be used In accordance with the preferred flexible filling process schematically illustrated in FIG. 12, raw milk is received and temporarily stored in raw storage vessels 470. Raw milk is drawn from the vessels and is processed into only nonfat and high-fat components 472*a* and 472*b*. These two components are blended together in fillers 474 to create the different butter fat content of milk in each bottle at (and which may vary from one bottle to the next) based on customer and delivery needs to the loadout facility 476 in a manner synchronized with the proper loading time of the vehicles 478.

Figure 13:
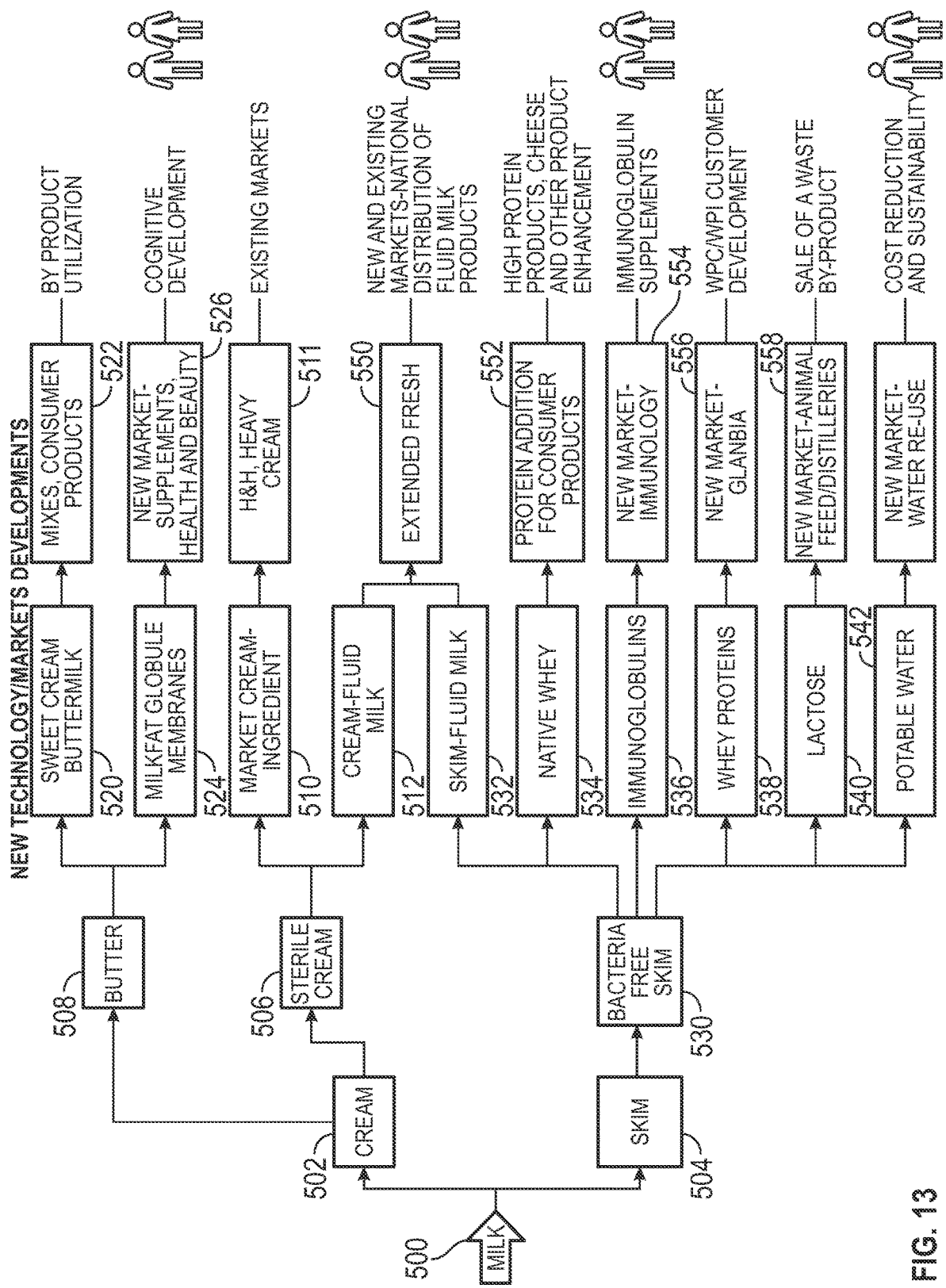
FIG. 13 is a graphical representation of different end uses of this milk processing.

FIG. 13 schematically illustrates how the milk 500 is initially separated into the cream 502 and skim 504 components. Thereafter, the cream 502 is separated into sterile cream 506 and butter 508. The sterile cream 506 is further segregated into a "market cream ingredient" 510 (used, for example, for half and half, heavy cream, etc. 511) and a cream-fluid milk 512 (combined with the skim fluid milk as will be referenced below). The butter 508 portion is separated into "sweet cream buttermilk" 520 for mixes and consumer products 522 and milkfat globule membranes 524 which represent a new market for supplements, health and beauty markets 526.

The skim portion 504 is treated to become a "bacteria free skim" 530 and as described above is separated into various intermediate products (namely, "skim-fluid milk" 532; "native whey" 534; "immunoglobulins" 536; "whey proteins" 538; "lactose" 540; and "potable water" 542) which can be used for different end uses. Specifically, the "skim—fluid milk" 532 is combined with the "cream-fluid milk" 512 to provide an extended fresh milk 550 that will satisfy new and existing markets; the "native whey" 534 is used in protein additions 552 for consumer products (e.g., high protein products, cheese, and other product enhancements); the immunoglobulins 536 are to be used in a potentially new market of immunoglobulin supplements 554; the whey proteins 538 for use in a new market 556 (Glanbia); the lactose 540 can be used for example in connection with animal feed and distilleries 558; and the potable water 542 can be advantageously developed into a water re-use 560 that results in desired cost reduction and sustainability.

Figure 14:
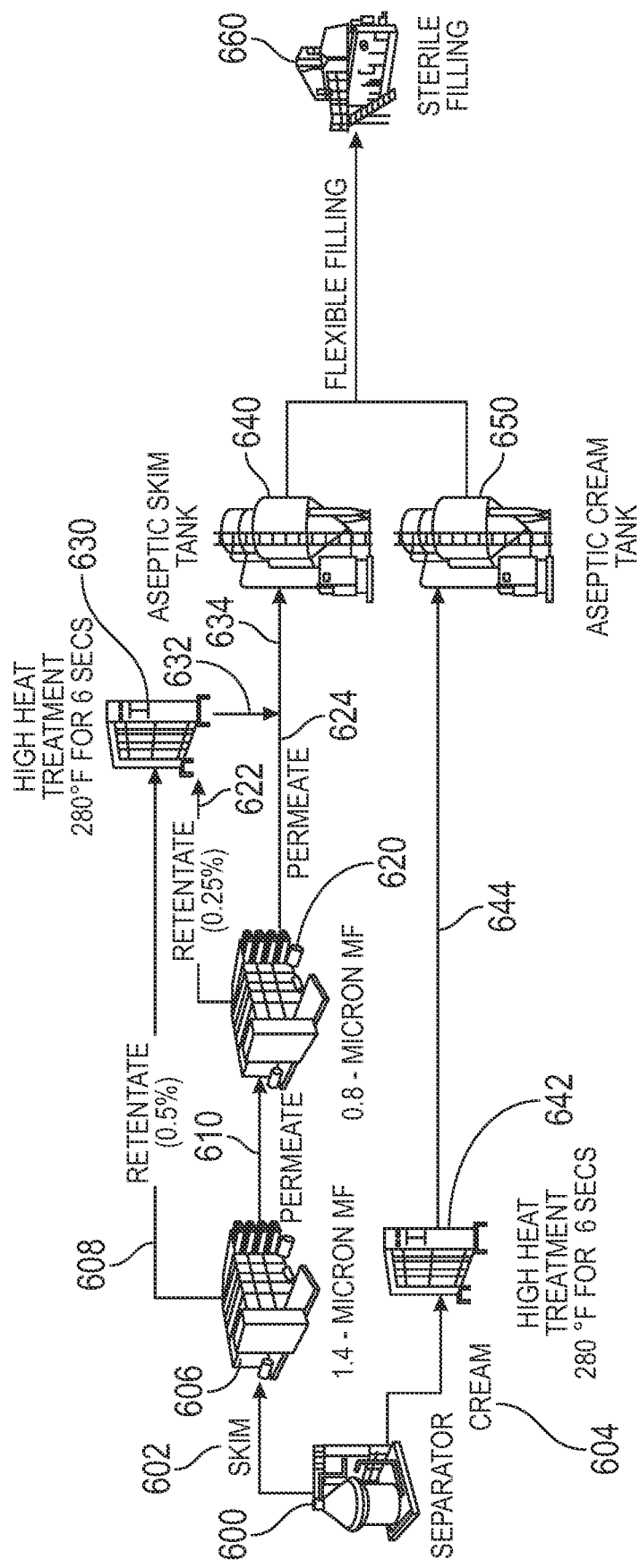
FIG. 14 is a summary flow chart of the milk process of the present disclosure.

FIG. 14 is a similar overview of the present milk processing. The raw milk enters a separator 600 and is separated into skim 602 and cream 604. The skim 602 enters a first filter (e.g., a 1.4 micron filter) 606 and a retentate 608 therefrom is separated from a permeate 610. The permeate 610 from the first filter 606 is directed through a second filter (e.g., a 0.8 micron filter) 620 that results in a retentate 622 and permeate 624 therefrom. The retentate 608 from the first filter 606 and the retentate 622 from the second filter 620 are introduced into a high heat treatment tank 630 and subject to a temperature of 280 degrees F. for six seconds. The combined heat-treated retentate 632 is then recombined with the permeate 624 from the second filter 620, and the combined stream 634 is then stored in an aseptic skim tank 640.

The cream 604 exiting the separator 600 also enters a high heat treatment of 280 degrees F. for six seconds in tank 642. Heat treated cream 644 therefrom is then stored in an aseptic cream tank 650. As described above, the flexible filling process (FIGS. 10-12) can utilize selected portions from the aseptic skim tank 640 and the aseptic cream tank 650 for introduction into a sterile filler 660 for packaging into bottles with different butter fat content (e.g., skim, 0.5%, 1%, 2%; 3.25%).

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods/processes described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

We claim:

1. A system that separates substances from associated raw milk comprising:
   a separator configured to separate the associated raw milk into (i) associated cream and (ii) associated skim milk;
   a downstream filter of the downstream separator and configured to segregate associated fat globules, bacteria, and casein from the associated skim milk;
   wherein the downstream filter includes a first filter portion which is on the order of 1.4 microns for retaining the bacteria and fat globules as first filter portion retentate, the first filter portion retentate of the bacteria and fat globules is sent to a high heat treatment and subsequently added back to the associated cream, a first filter portion permeate is directed to a second filter portion which is on the order of 0.8 microns for separating remaining bacteria and casein, a second filter portion retentate is directed to high heat treatment and subsequently added to clean skim storage, and a second filter portion permeate is sent directly to clean skim storage.

2. The system of claim 1 further comprising a heater upstream of the separator to elevate a temperature of the associated raw milk to at least 135 degrees F. to facilitate separation of the associated raw milk into (i) the associated cream and (ii) the associated skim milk.

3. The system of claim 2 wherein the downstream filter has an inlet that receives the associated skim milk, and a first outlet that directs the first filter portion retentate from the downstream filter to a passage that reintroduces the first filter portion retentate into the associated cream.

4. The system of claim 3 further comprising a high heat treatment heater that receives the associated cream and is configured to elevate a temperature of the associated cream.

5. The system of claim 4 further comprising second and third passages that receive the associated cream and the associated skim milk, respectively, from downstream of the filter to combine desired proportions thereof and provide associated milk having desired fat content upstream of a pasteurization stage.

6. The system of claim 1 further comprising a cooling mechanism downstream of the filter to cool the second filter portion permeate that exits the downstream filter.

7. The system of claim 6 wherein the cooling mechanism cools the second filter portion permeate that exits the downstream filter to about 38 degrees Fahrenheit.

8. The system of claim 7 further comprising second and third passages that receive the associated cream and the associated skim milk, respectively, to combine desired proportions thereof and provide associated milk having desired fat content upstream of a pasteurization stage.

9. The system of claim 1 further comprising a heater located upstream of the separator to elevate a temperature of the associated raw milk to at least 65 degrees Fahrenheit before introduction of the raw milk into the separator.

10. The system of claim 1 further comprising a pump that pressurizes the associated raw milk to 5 psi through the downstream filter.

11. The system of claim 1 further comprising at least one or more of:
- a nanofiltration first filter (500,000 Dalton) to harvest natural whey;
- a nanofiltration second filter (100,000 Dalton) to harvest immunoglobulin (IgG) and/or alpha/beta lac Albumin; or
- a nanofiltration third filter (10,000 Dalton) to harvest whey protein isolate and/or lactose concentration.

* * * * *